G. A. BRUCE.
Seed-Planter.
No. 10,064.
Patented Oct. 4, 1853.
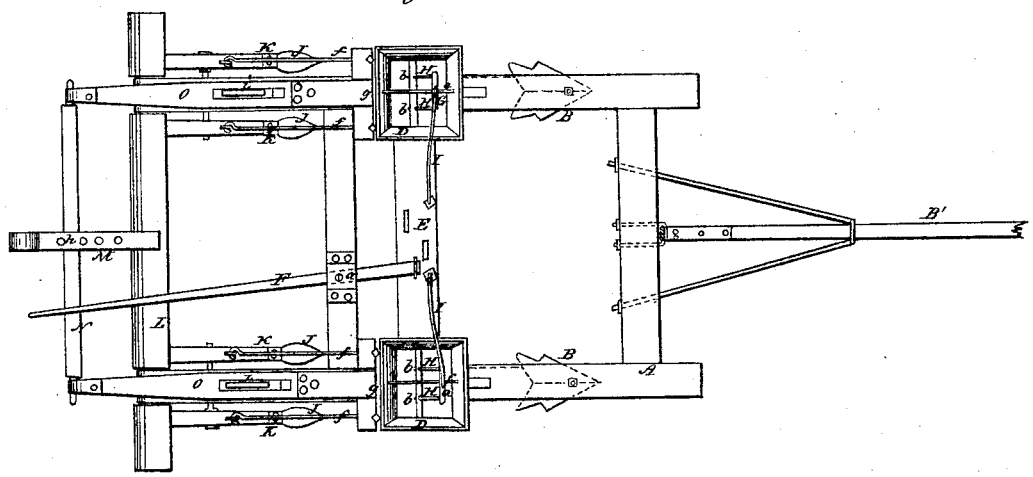
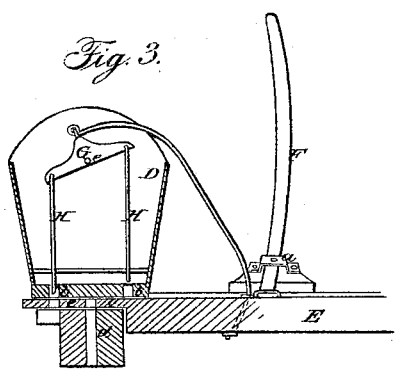
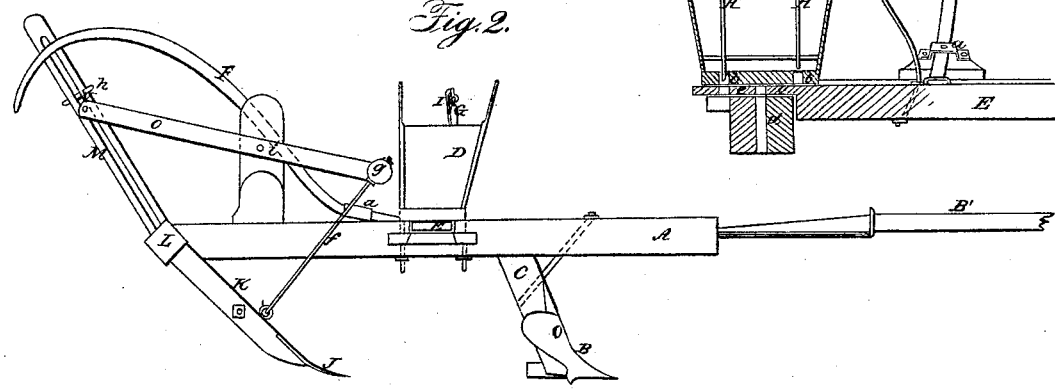

UNITED STATES PATENT OFFICE.

GARDNER A. BRUCE, OF MECHANICSBURG, ILLINOIS.

IMPROVEMENT IN CORN-PLANTERS.

Specification forming part of Letters Patent No. 10,064, dated October 4, 1853.

*To all whom it may concern:*

Be it known that I, GARDNER A. BRUCE, of Mechanicsburg, in the county of Sangamon and State of Illinois, have invented certain new and useful Improvements in Drills for Planting Corn and other Seeds; and I do hereby declare that the following is a full, clear, and exact description of the construction and operation of the same, reference being had to the annexed drawings, making a part of this specification, in which—

Figure 1 is plan or top view of my improved drill. Fig. 2 is a side elevation of the same. Fig. 3 is a vertical section of one of the hoppers, showing the manner in which the seed is distributed or passed from the hoppers to the earth. The hopper is bisected in a direction transversely of the frame of the drill.

Similar letters of reference indicate corresponding parts in each of the several figures.

This invention relates to certain new and useful improvements in drills for planting corn and other seeds.

My invention consists in a peculiar manner of distributing the seed—viz., by means of a small balance-beam placed in the hopper, said beam having wires attached to each end, which, as the beam is operated, fit or work alternately in apertures in the bottom of the hopper and properly adjust the seed in the apertures of the dropping-slide. This will be fully described hereinafter.

To enable others skilled in the art to make and use my invention, I will proceed to describe its construction and operation.

A represents the frame of the machine, having a draft-pole, B', attached to its front cross-piece.

B B are furrow-shares secured to projections C C underneath the side pieces of the frame A.

Directly behind the furrow-shares are placed two hoppers, D D, one behind each share. These hoppers are secured on the upper surfaces of the side pieces of the frame. Underneath the bottoms of the hoppers there is a dropping-slide, E, which extends entirely across the frame, the ends of the slide passing under the bottoms of the two hoppers. The slide E has a reciprocating motion communicated to it by means of the lever F, having its fulcrum at $a$. The bottoms of the hoppers D D have each two holes or apertures, $b\ b$, through them, and each end of the dropping-slide E has also two holes, $c\ c$, through it, the holes $c\ c$ through each end of the dropping-slide being only one-half the distance apart that the holes $b\ b$ in the bottoms of the hoppers are, as seen in Fig. 3. Through each side piece of the frame there is a hole or aperture, $d$, extending entirely through it in a vertical direction, and immediately underneath each hopper D, as seen in Fig. 3.

G G are balance-beams, one in each hopper D. These beams vibrate in rods $e\ e$, and to each end of the beams there are attached vertical rods H H, the lower ends of which work or fit alternately in the holes $b\ b$ in the bottoms of the hoppers. The balance-beams are operated by means of connecting-rods I I, a rod I being attached to the center of the upper part of each beam, and the opposite end of the rod being attached to the dropping-slide E, as seen in Figs. 1 and 3.

The operation of the distributing apparatus will be readily understood. As the machine is drawn along the furrow-shares B B open the furrows that are to receive the seed, and the seed is dropped by working laterally to the left and to the right the lever F by hand. This working of the lever F communicates to the dropping-slide E a reciprocating motion. By referring to Fig. 3 it will be seen that when one of the holes $c$ in the dropping-slide is over the hole $d$ in the side piece of the frame the other hole $c$ is under one of the holes $b$ in the bottom of the hopper. Now, when one hole $c$ is over the hole $d$ a seed drops from the hole $c$ through the hole $d$ into the furrow, and one of the rods H is forcing a seed from the hopper into the other hole $c$ through the hole $b$. Thus the rods H H of each hopper work alternately downward and force the seed into the holes $c$, the seed from the holes $c$ falling through the hole $d$ into the furrow as each hole $c$ is brought over the hole $d$. The device in both hoppers is precisely the same. Thus it will be seen that the seed, by means of the balance-beams and rods, will be properly adjusted in the holes of the dropping-slide, and there can be no danger of the holes being clogged or stopped with seed, as the rods will clear them.

Behind the hoppers D D are placed covering-shares J J J J, two on each side of the frame, as seen in Fig. 1. These covering-shares are attached to projections K K K K, which are secured to a beam, L, which fits in sockets at the ends of the side pieces of the frame. The beam L turns in the sockets. At about the center of this beam L there is a slotted arm, M, (seen in Figs. 1 and 2,) projecting upward from the beam. Through this slotted lever a cross-piece, N, passes, the ends of which work in the outer ends of levers O O, having their fulcra at $i$. The inner ends of the levers O O are attached by rods $ffff$ to the projections K K K K, as seen in Fig. 2, the rods $f$ being attached to the inner ends of the levers O O by joints $g$. It will be seen that when the covering-shares act upon the earth they would be thrown back if not checked, as the beam L works loosely in sockets. This is prevented by a pin, $h$, which passes through the slotted lever, as seen in Fig. 2, and prevents the cross-piece N from rising in the slot in the arm M. Now, by placing this pin $h$ through the arm M at a high or low point the covering-shares will be elevated or depressed in a corresponding degree and will enter the earth to the desired depth; and by depressing or throwing back the arm M sufficiently far the covering-shares may be elevated so as to clear the earth entirely. The covering-shares of course throw the earth into the furrows and upon the seed deposited therein. The object in elevating the covering-shares entirely above the earth is to prevent the shares from coming in contact with the earth when the machine is being removed from one place to another.

I do not claim the dropping-slide nor any peculiar arrangement thereof, as they are used in many drills, and are constructed and operated substantially as the one herein shown; but, Having described the nature and operation of my invention, what I claim as new, and desire to secure by Letters Patent, is—

The employment or use of the balance-beams G G, with the rods H H attached to them, and operating as described, for the purpose of properly adjusting the seed in the holes of the dropping-slide, and also to prevent the clogging of the same, as shown and described in the body of the specification.

GARDNER A. BRUCE.

Witnesses:
A. T. THOMPSON,
HARVY THOMPSON.